UNITED STATES PATENT OFFICE.

CORNELIUS C. HOFF, OF POUGHKEEPSIE, NEW YORK.

MASTIC COMPOSITION FOR ROOFING.

Specification forming part of Letters Patent No. 32,290, dated May 14, 1861.

*To all whom it may concern:*

Be it known that I, CORNELIUS C. HOFF, of Poughkeepsie, in the county of Dutchess and State of New York, have invented a new and Improved Deodorized Mastic Roofing; and I do hereby declare that the following is a full, clear, and exact description of the same.

This invention consists in mixing gas-tar previously treated with chloride of lime, as hereinafter stated, with black oxide of manganese, plaster-paris, alum, and calcined charcoal, and applying this composition to the canvas after the same has been properly fastened down to the roof.

In order to prepare the tar I place in a suitable kettle thirty gallons of gas-tar and mix with it five pounds of chloride of lime. I then apply heat until the more volatile portions of the tar—such as benzole, naphtha, and dead-oil—are carried away, and until a sample, on cooling, shows a suitable consistency. During the application of heat the mass must be constantly stirred. As soon as the volatile portion of the tar is driven off the peculiar frothing or foaming of the liquid stops, and when this takes place the heat must be withdrawn. The acids contained in the volatile matter of the tar are very destructive to the fiber of the canvas, as may be plainly seen on all roofs which have been prepared without the above precaution. By my process the largest portion of these acids is expelled by the heat, and what remains is neutralized by the chloride of lime, and at the same time the tar is completely deodorized. After the tar is thus prepared I next add one gallon of silicate of soda (soluble glass) and ten pounds of plaster-paris, which has been previously boiled. These ingredients are incorporated by thorough agitation, and the canvas is saturated by passing it through this preparation while hot and then running it through finely-powdered soapstone or plaster-of-paris.

For the last covering or final finish of the roof, after the canvas is secured on the same, I use the following mixture: To thirty gallons of gas-tar prepared as above described I add five pounds of boiled plaster-of-paris, five pounds of pure powdered alum, and ten pounds of calcined charcoal. These materials must be thoroughly mixed and applied to the canvas, and while the coating is yet warm it is covered with sand.

Having thus fully described my invention, what I claim as new, and desire to secure by Letters Patent, is—

The within-described composition of gas-tar treated and prepared in the manner herein specified, black oxide of manganese, boiled plaster-paris, alum, and calcined charcoal, mixed together in the manner and about in the proportion stated, and applied to the canvas substantially as and for the purpose set forth.

CORNELIUS C. HOFF.

Witnesses:
CHARLES PEARL,
JAMES T. HILL.